(12) United States Patent
Matsuda

(10) Patent No.: US 11,014,438 B2
(45) Date of Patent: May 25, 2021

(54) HYBRID STRADDLE VEHICLE

(71) Applicant: KAWASAKI JUKOGYO KABUSHIKI KAISHA, Kobe (JP)

(72) Inventor: Yoshimoto Matsuda, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 111 days.

(21) Appl. No.: 16/220,446

(22) Filed: Dec. 14, 2018

(65) Prior Publication Data

US 2019/0202279 A1    Jul. 4, 2019

(30) Foreign Application Priority Data

Dec. 28, 2017    (JP) .............................. JP2017-254179

(51) Int. Cl.
*B60K 1/04*    (2019.01)
*B60K 6/442*    (2007.10)
(Continued)

(52) U.S. Cl.
CPC .............. *B60K 6/442* (2013.01); *B62J 35/00* (2013.01); *B62K 21/26* (2013.01); *B62M 23/02* (2013.01); *B60K 6/00* (2013.01); *B60L 2200/12* (2013.01); *B60W 10/06* (2013.01); *B60W 10/08* (2013.01); *B60W 10/26* (2013.01); *B60W 20/10* (2013.01);
(Continued)

(58) Field of Classification Search
CPC . B60K 6/442; B60K 6/00; B60K 6/48; B62K 21/26; B62K 2204/00; B62J 35/00; B62J 43/00; B62M 23/02; B60L 2200/12; B60W 10/06; B60W 10/08; B60W 10/26; B60W 20/10; B60W 2300/36; B60Y 2200/12

See application file for complete search history.

(56) References Cited

U.S. PATENT DOCUMENTS 6,213,514 B1 * 4/2001 Natsume .................. B62J 35/00
                                                                280/833
6,910,716 B2 * 6/2005 Kurayoshi ............... B62J 35/00
                                                                280/835
(Continued)

FOREIGN PATENT DOCUMENTS

CN            1699087 A      11/2005
CN          101947996 A       1/2011
(Continued)

OTHER PUBLICATIONS

China National Intellectual Property Administration, English translation of Search Report Issued in Application No. 201811582734X, Mar. 31, 2020, 2 pages.

*Primary Examiner* — Jacob B Meyer
(74) *Attorney, Agent, or Firm* — Alleman Hall Creasman & Tuttle LLP

(57) ABSTRACT

A hybrid straddle vehicle comprises a hybrid traveling driving power unit including an engine and a traveling motor, the hybrid traveling driving power unit being configured to generate driving power for allowing the hybrid straddle vehicle to travel; a fuel tank which stores therein fuel to be supplied to the engine; and a battery unit which stores therein electric power to be supplied to the traveling motor. An outer end of the fuel tank in a vehicle width direction is located outward of the battery unit in the vehicle width direction.

19 Claims, 4 Drawing Sheets

(51) Int. Cl.
  *B62M 23/02* (2010.01)
  *B62K 21/26* (2006.01)
  *B62J 35/00* (2006.01)
  *B60K 6/00* (2006.01)
  *B62J 43/00* (2020.01)
  *B60W 10/06* (2006.01)
  *B60W 10/08* (2006.01)
  *B60W 10/26* (2006.01)
  *B60W 20/10* (2016.01)

(52) U.S. Cl.
  CPC ............ *B60Y 2200/12* (2013.01); *B62J 43/00* (2020.02); *B62K 2204/00* (2013.01)

(56) References Cited

U.S. PATENT DOCUMENTS

| | | | | |
|---|---|---|---|---|
| 7,475,749 | B2* | 1/2009 | Yoshida | B62J 35/00 180/229 |
| 7,690,689 | B2* | 4/2010 | Muroo | B62J 35/00 280/833 |
| 9,643,677 | B2* | 5/2017 | Mizukura | B62K 11/04 |
| 2005/0257974 | A1* | 11/2005 | Nakagawa | B60L 50/16 180/68.5 |
| 2008/0011743 | A1 | 1/2008 | Edwards | |
| 2009/0166364 | A1* | 7/2009 | Shimomura | B62J 35/00 220/562 |
| 2012/0325571 | A1* | 12/2012 | Nomura | B60K 6/48 180/220 |
| 2016/0090140 | A1* | 3/2016 | Mizukura | B62K 11/04 180/219 |
| 2019/0202279 | A1* | 7/2019 | Matsuda | B62M 23/02 |
| 2020/0269946 | A1* | 8/2020 | Carmignani | B62J 9/14 |
| 2020/0269956 | A1* | 8/2020 | Carmignani | B62K 19/46 |
| 2020/0277019 | A1* | 9/2020 | Carmignani | B62J 1/12 |
| 2020/0283084 | A1* | 9/2020 | Carmignani | B62J 43/16 |
| 2020/0283094 | A1* | 9/2020 | Carmignani | B62K 11/00 |
| 2020/0339218 | A1* | 10/2020 | Carmignani | B62J 40/00 |

FOREIGN PATENT DOCUMENTS

| | | |
|---|---|---|
| CN | 105460133 A | 4/2016 |
| EP | 1598230 A1 | 11/2005 |
| EP | 1661197 A1 | 7/2006 |
| JP | 2005231424 A | 9/2005 |
| JP | 3159814 U | 6/2010 |
| JP | 2012228983 A | 11/2012 |
| JP | 2015016746 A | 1/2015 |

* cited by examiner

HYBRID STRADDLE VEHICLE

CROSS-REFERENCE TO RELATED APPLICATION

This application claims priority to and the benefit of Japanese Patent Application No. 2017-254179 filed on Dec. 28, 2017, the entire disclosure of which is incorporated herein by reference.

BACKGROUND OF THE INVENTION

Field of the Invention

The present invention relates to a straddle vehicle such as a motorcycle. In particular, the present invention relates to a hybrid straddle vehicle.

Description of the Related Art

Japanese Laid-Open Patent Application Publication No. 2015-16746 discloses a motorcycle which includes only an engine as a traveling driving power unit which generates driving power for allowing the motorcycle to travel, as an example of a straddle vehicle. A fuel tank of this motorcycle includes a pair of right and left front tanks and a rear tank provided inside a rear frame.

In a case where a hybrid traveling driving power unit is used in the straddle vehicle, the straddle vehicle includes a traveling motor and a battery unit for supplying electric power to the traveling motor, in addition to an engine and a fuel tank. Each of the battery unit and the fuel tank is required to have a substantial volume. For this reason, it is difficult to secure a space in which the battery unit and the fuel tank are disposed.

SUMMARY OF THE INVENTION

In view of the above, an object of the present invention is to secure spaces in which a battery unit and a fuel tank are placed, in a hybrid straddle vehicle.

According to an aspect of the present invention, a hybrid straddle vehicle comprises a hybrid traveling driving power unit including an engine and a traveling motor, the hybrid traveling driving power unit being configured to generate driving power for allowing the hybrid straddle vehicle to travel; a fuel tank which stores therein fuel to be supplied to the engine; and a battery unit which stores therein electric power to be supplied to the traveling motor, wherein an outer end of the fuel tank in a vehicle width direction is located outward of the battery unit in the vehicle width direction.

In accordance with this configuration, in a case where the hybrid traveling driving power unit is used as the traveling driving power unit of the straddle vehicle, the battery unit with a relatively large weight can be disposed at a location that is close to a center in the vehicle width direction. The center of gravity of the straddle vehicle can be made close to the center of the straddle vehicle. The straddle vehicle can improve a turn performance. The fuel tank is disposed in a space formed outward of the battery unit in the vehicle width direction. The volume of the fuel tank can be increased as much as possible.

The above and further objects, and advantages of the invention will more fully be apparent from the following detailed description with reference to the accompanying drawings.

DETAILED DESCRIPTION OF THE PREFERRED EMBODIMENTS

Hereinafter, the embodiment will be described with reference to the drawings. Throughout the drawings, the same or corresponding components (constituents) are designated by the same reference symbols and repeated description thereof is omitted.

Figure 1:
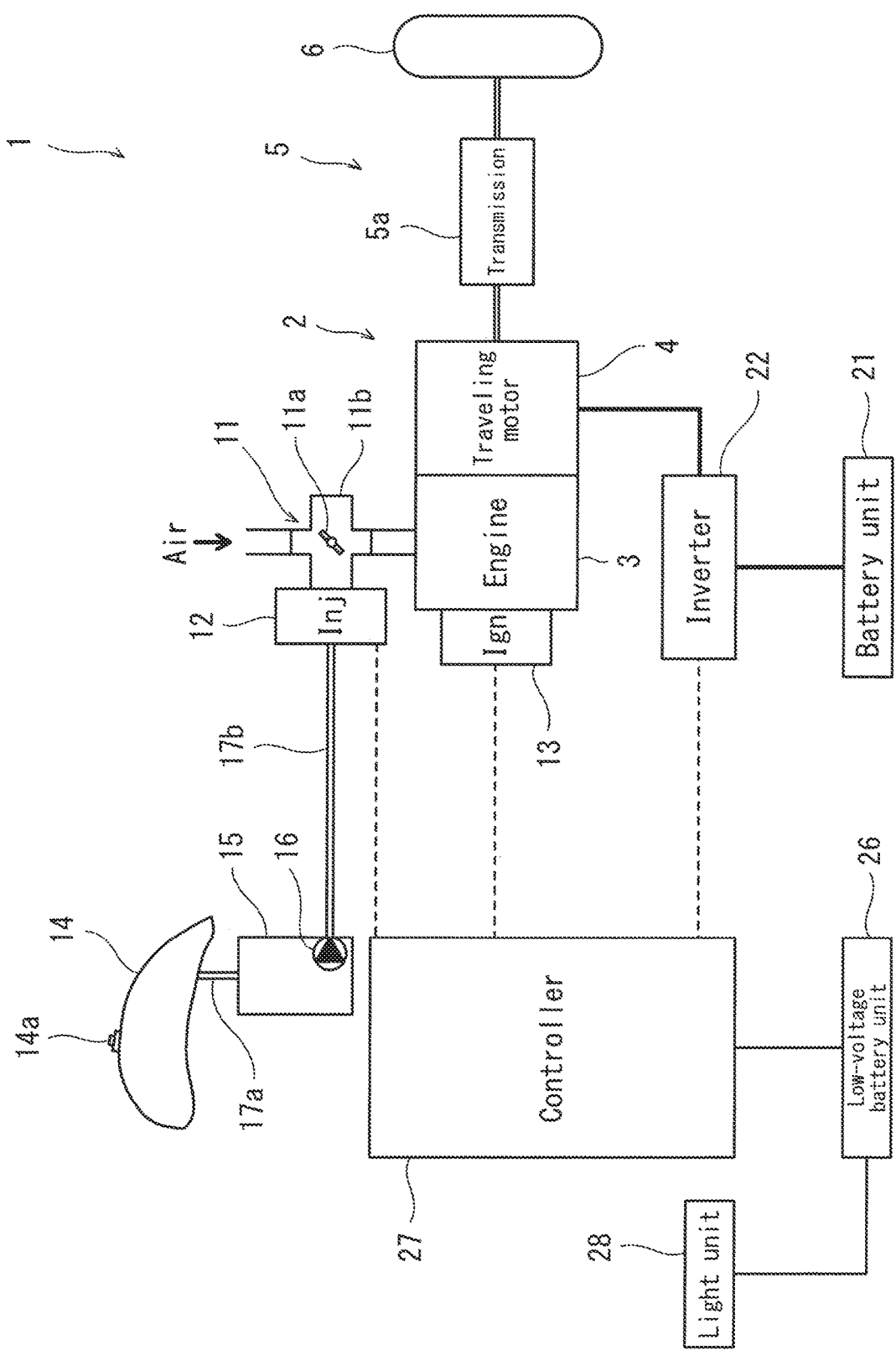
FIG. 1 is a schematic view showing a driving system of a straddle vehicle according to an embodiment.

FIG. 1 is a schematic view showing a driving system mounted in a straddle vehicle 1 according to the embodiment. Referring to FIG. 1, the straddle vehicle 1 includes a traveling driving power unit 2 which generates driving power for allowing the straddle vehicle 1 to travel. The traveling driving power unit 2 is a hybrid traveling driving power unit including an engine 3 and a traveling motor 4. A power generation method or a driving method for the traveling driving power unit 2 is not particularly limited. Although FIG. 1 shows a parallel method, for easier or exemplary illustration, the power generation method or the driving method may be a series method or a split method. Driving power generated in the traveling driving power unit 2 is transmitted to a drive wheel 6 via a driving power transmission mechanism 5. The driving power transmission mechanism 5 may include a transmission 5a.

Figure 2:
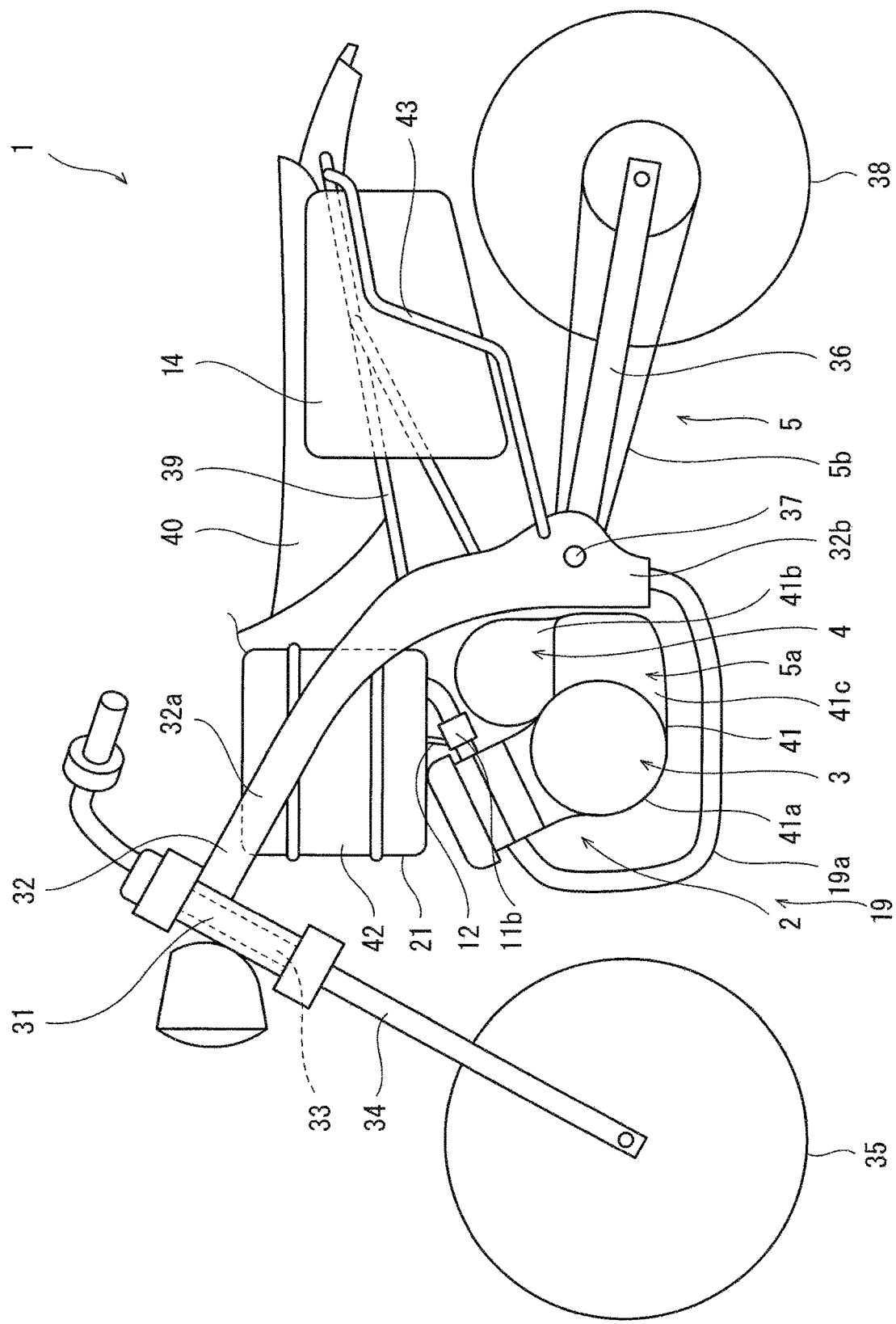
FIG. 2 is a side view showing a motorcycle which is an example of the straddle vehicle according to the embodiment.

As shown in FIG. 2, the straddle vehicle 1 is a motorcycle including one front wheel and one rear wheel. In this case, the rear wheel is a drive wheel 6. Alternatively, the straddle vehicle 1 may be a motorized tricycle (motor trike), a buggy car, or an all terrain vehicle (ATV) including two front wheels 2 and one rear wheel 3 or one front wheel 2 and two rear wheels 3.

For example, the engine 3 is a spark ignition internal combustion engine which combusts liquid fuel such as gasoline and generates engine power. The engine 3 includes a throttle valve 11 which changes an intake-air amount, an injector 12 which injects fuel, an ignition plug 13 which generates a spark inside a combustion chamber, and an exhaust system 19 which exhausts an exhaust gas from the engine 3 to outside air. The throttle valve 11 includes a valve body 11a and a throttle body 11b accommodating the valve body 11a therein. In the present embodiment, the injector 12 is attached on the throttle body 11b. The exhaust system 19 includes an exhaust manifold 19a which leads the exhaust gas from the engine 3, and a muffler 19b which reduces (muffles) an exhaust noise.

The straddle vehicle 1 includes an engine fuel system which stores the fuel for the engine 3, and supplies the stored fuel to the engine 3. In the present embodiment, the engine fuel system includes the injector 12, a fuel tank 14, a fuel chamber 15, a fuel pump 16, and fuel pipes 17a, 17b. Each of the fuel tank 14 and the fuel chamber 15 is capable of reserving the fuel therein. The fuel chamber 15 is disposed between the fuel tank 14 and the injector 12. The fuel pump 16 is accommodated in the fuel chamber 15. When the fuel pump 16 is actuated, a pressure of the fuel inside the fuel chamber 15 is increased, and the fuel with the increased pressure is supplied to the injector 12. When the injector 12 injects the fuel, the fuel is supplied from the fuel tank 14 to the fuel chamber 15. The fuel tank 14 includes a fuel supply port 14a. The fuel can be supplied from an external fuel supply source (e.g., gas station) to the fuel tank 14 via the fuel supply port 14a. For the purpose of storage of the fuel, the straddle vehicle 1 includes the fuel tank 14 and the fuel chamber 15. This allows the straddle vehicle 1 to travel over a long distance. Note that the fuel chamber 15 may be omitted. In a case where the fuel chamber 15 is omitted, the fuel pipes 17a, 17b may be omitted as desired, and the location of the fuel pump 16 may be suitably changed (e.g., the fuel pump 16 may be disposed inside the fuel tank 14).

The straddle vehicle 1 includes a battery unit 21 which stores therein electric power to be supplied to the traveling motor 4. The traveling motor 4 is an AC motor. The straddle vehicle 1 includes an inverter 22. The inverter 22 is configured to convert DC power received from the battery unit 21 into AC power and to supply the AC power to the traveling motor 4. In addition to the battery unit 21, the straddle vehicle 1 includes a low-voltage battery unit 26 used as an electric power supply for supplying electric power to an electric system mounted in the straddle vehicle 1. The electric system includes a controller 27 which controls the injector 12, the ignition plug 13, and the inverter 22, and a light unit 28 such as a head light. The controller 27 may be configured to control actuation of the throttle valve 11. Alternatively, the battery unit 21 and the low-voltage battery unit 26 may be connected to each other via a DC/DC converter.

Hereinafter, the layout of the driving system and the associated components (constituents) will be described. The stated directions are from the perspective of a rider straddling the straddle vehicle 1. A vehicle width direction of the straddle vehicle 1 corresponds with a rightward and leftward direction of the straddle vehicle 1. A vehicle length direction of the straddle vehicle 1 corresponds with a forward and rearward direction of the straddle vehicle 1. Regarding the vehicle width direction, a side which is close to a vehicle width center line of the straddle vehicle 1 will be referred to as an inner (inward) side and a side which is distant from the vehicle width center line will be referred to as an outer (outward) side.

Figure 3:
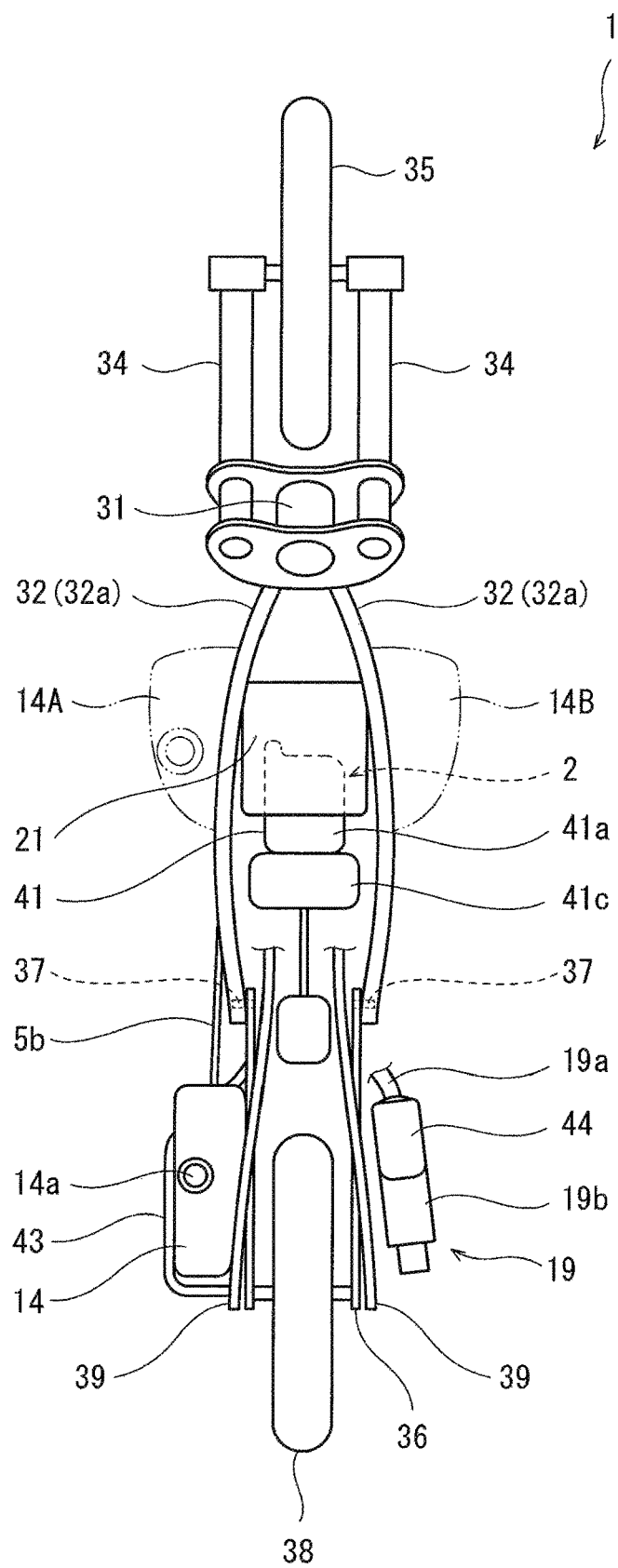
FIG. 3 is a plan view showing the motorcycle which is an example of the straddle vehicle according to the embodiment.

FIG. 2 is a side view showing a motorcycle 1 which is an example of the straddle vehicle according to the embodiment. FIG. 3 is a plan view of the motorcycle 3. Referring to FIGS. 2 and 3, a vehicle body frame 30 of the straddle vehicle 1 includes a head pipe 31, and a main frame 32 extending rearward from the head pipe 31. The head pipe 31 is disposed on the vehicle width center line. A steering shaft 33 is rotatably supported by the head pipe 31. The both end portions of the front wheel 35 are supported by the lower end portions, respectively of a pair of front forks 34 which are rotatable together with the steering shaft 33 so that the front wheel 35 is rotatable.

In the present embodiment, the main frame 32 includes a pair of right and left main frames 32. The pair of right and left main frames 32 are disposed symmetrically and have a symmetric shape with respect to the vehicle width center line. Each of the pair of right and left main frames 32 includes a rearward extension part 32a extending rearward from the head pipe 31, and a downward extension part 32b extending downward from the rear end portion of the rearward extension part 32a so that the main frame 32 is bent at the rear end portion of the rearward extension part 32a. The rearward extension part 32a also extends outward in the vehicle width direction from the head pipe 31. Further, the rearward extension part 32a extends in a slightly downward direction.

The front end portions of a swing arm 36 are supported by the downward extension parts 32b, respectively, of the main frames 32 so that the swing arm 36 is pivotable around pivots 37 extending in the vehicle width direction. The rear end portions of the swing arm 36 are supported by an axle of the rear wheel 38 so that the swing arm 36 is pivotable. Note that a rear suspension (not shown) is provided between the vehicle body frame 30 and the swing arm 36 to connect the vehicle body frame 30 and the swing arm 36 to each other.

The vehicle body frame 30 includes a pair of right and left rear frames 39 extending rearward from the main frames 32, respectively (to be precise, from the rear portions of the rearward extension parts 32a or the upper portions of the downward extension parts 32b). The rear frames 39 are disposed above the swing arm 36. The rear frames 36 are slightly inclined in an upward direction, as the rear frames 39 extend rearward from the main frames 32, respectively. A seat 40 is supported over the rear frames 39. The rider can straddle the seat 40.

The engine 3, the traveling motor 4, and the transmission 5a are accommodated in a driving source casing 41 and integrated into a unit or an assembly. The driving source casing 41 includes an engine casing (including a crankcase, a cylinder block, and a cylinder head) 41a, a motor casing 41b, and a transmission casing 41c. The transmission casing 41c is integrally coupled to the rear surface of the lower portion of the engine casing 41a. When viewed from the side (in a side view), the engine casing 41a and the transmission casing 41c are formed in a L-shape in a side view. The motor casing 41b is integrally coupled to the upper surface of the transmission casing 41c or the rear surface of the upper portion of the engine casing 41a.

The driving source casing 41 is supported by the main frames 32. The driving source casing 41 is disposed below the main frames 32 (to be precise, below the rearward extension parts 32a and forward of the downward extension parts 32b). The driving power transmission mechanism 5 includes a driving power transmission unit 5b (e.g., chain transmission unit) disposed between the transmission 5a and the rear wheel 38. The driving power transmission unit 5b is disposed on a first side (e.g., left side) in the vehicle width direction, relative to the driving source casing 41 and the rear wheel 38. An exhaust manifold 19a extends downward from the front surface of the upper portion of the engine casing 41a and then extends rearward at a location that is below the driving source casing 41. Then, the exhaust manifold 19a extends to a second side (e.g., right side) in the vehicle width direction. A muffler 19b is disposed on a side (e.g., right side) opposite to the driving power transmission unit 5b in the vehicle width direction, with respect to the rear wheel 38 as a reference.

The battery unit 21 includes battery cells (not shown) and a battery case 42 accommodating the battery cells. For example, the battery case 42 has a rectangular box shape. The battery unit 21 is disposed at a center region in the vehicle width direction. The vehicle width center line passes through the battery unit 21. In exemplary layout, the battery unit 21 is disposed in a space formed between the pair of right and left main frames 32 and sandwiched between the pair of right and left main frames 32. In other words, the pair of right and left main frames 32 extend in the vehicle length direction, at locations that are outward of the side surfaces of the battery unit 21 in the vehicle width direction, and partially cover the side surfaces, respectively, of the battery unit 21.

The layout of the battery unit 21 and components (constituents) other than the main frames 32 will be specifically described. The battery unit 21 is disposed above the driving source casing 41 and/or the pivots 37. The battery unit 21 is disposed rearward of the axle of the front wheel 35, rearward of the head pipe 31, forward of the axle of the rear wheel 38, forward of the seat 40, and/or forward of the pivots 37.

The fuel tank 14 and the fuel chamber 15 are disposed while preventing interference with the battery unit 21 and the driving source casing 41. In the present embodiment, a space in which the fuel tank 14 is disposed is secured in a relatively rear portion of the straddle vehicle 1 (see modified example in a case where the space in which the fuel tank 14 is disposed is secured in the front portion of the straddle vehicle 1).

The fuel tank 14 is disposed in a region that is between the axle of the rear wheel 38 and the pivots 37, in the forward and rearward direction. In this region, as described above, the rear frames 39, the swing arm 36, the driving power transmission unit 5*b*, and the muffler 19*b* are placed. The fuel tank 14 is disposed rearward of the engine 3, the traveling motor 4 and the battery unit 21. The fuel tank 14 is disposed so that the fuel tank 14 does not overlap with the engine 3, the traveling motor 4 and the battery unit 21 in a side view.

The fuel tank 14 is disposed above the driving power transmission unit 5*b* and the swing arm 36. The fuel tank 14 is disposed at a location that is below and lateral of the seat 40. To prevent interference between the fuel tank 14 and the leg and thigh of the rider straddling the seat 40, the fuel tank 14 is disposed rearward of the pivot 37 or the downward extension part 32*b* of the main frame 32.

The fuel tank 14 is supported by the rear frame 39. The fuel tank 14 is disposed outward of the rear frame 39 in the vehicle width direction. The fuel tank 14 is disposed outward of the main frame 32 in the vehicle width direction. In the present embodiment, the fuel tank 14 is disposed on the same side (e.g., left side) in the vehicle width direction as a side where the driving power transmission unit 5*b* is disposed, with respect to the vehicle width center line.

The upper end of the fuel tank 14 is located below the upper end of the battery unit 21. The fuel tank 14 is disposed at a location that is substantially as high as the seat 40.

The fuel chamber 15 is disposed inward of the fuel tank 14 in the vehicle width direction. The fuel chamber 15 is disposed forward of the fuel tank 14 and rearward of the injector 12 (and the throttle body 11*b* to which the injector 12 is attached). When viewed from the front (in a front view), the fuel chamber 15 is disposed between the right and left front forks 34. Note that the fuel chamber 15 is located distantly from the right and left front forks 34 in the forward and rearward direction and is not sandwiched between the right and left front forks 34.

In the above-described layout, the outer end of the fuel tank 14 in the vehicle width direction is located outward of the battery unit 21, in the vehicle width direction. In a case where the traveling driving power unit 2 is a hybrid traveling driving power unit, the battery unit 21 with a relatively large weight can be disposed at the center region of the straddle vehicle 1 in the vehicle width direction. The center of gravity of the whole straddle vehicle 1 is easily located to be close to the center of the straddle vehicle 1. The straddle vehicle 1 can improve a turn performance. The fuel tank 14 is disposed in a space formed outward of the battery unit 21 in the vehicle width direction. The volume of the fuel tank 14 can be increased as much as possible.

The fuel tank 14 is disposed rearward of the engine 3, the traveling motor 4, and the battery unit 21. Since the fuel tank 14 is disposed distantly from the components (constituents) with a relatively large volume, such as the traveling driving power unit 2 (the engine 3 and the traveling motor 4) and the battery unit 21, in the forward and rearward direction, it becomes easy to secure a space in which the fuel tank 14 is disposed, in the vehicle width direction and in the forward and rearward direction. This makes it possible to increase the volume of the fuel tank 14 as much as possible.

Since the fuel tank 14 is disposed at a location that is rearward of the pivot 37, in the relatively rear portion of the straddle vehicle 1, it becomes possible to prevent the interference between the fuel tank 14 and the leg and thigh of the rider steering the straddle vehicle 1. Therefore, during traveling of the motorcycle 1, the rider is not forced to have a crammed posture. Since the fuel tank 14 is disposed forward of the axle of the rear wheel 38, the center of gravity of the whole straddle vehicle 1 can be easily made close to the center of the straddle vehicle 1.

The fuel tank 14 is disposed outward of the rear frame 39 in the vehicle width direction. As a result, the fuel tank 14 is disposed outward of the seat 40 in the vehicle width direction. A space for the seat 40 or a luggage carrier can be secured as in conventional layout. In this state, the volume of the fuel tank 14 can be increased as much as possible. In this case, since the fuel tank 14 is supported by the rear frame 39, the fuel tank 14 can be firmly mounted on the straddle vehicle 1.

The center of gravity of the battery unit 21 is located between the right and left front forks 34. The center of gravity of the battery unit 21 is present on the vehicle width center line or at a location that is close to the vehicle width center line. In contrast, the center of gravity of the fuel tank 14 is located outward of one of the right and left front forks 34 in the vehicle width direction, in a state in which the fuel tank 14 is fully filled with the fuel (the fuel tank 14 is full of the fuel). The battery unit 21 has a weight greater than that of the fuel tank 14 which is fully filled with the fuel. In the straddle vehicle 1 which requires the battery unit 21 with a large volume and the fuel tank 14 with a large volume to allow the straddle vehicle 1 to travel, the center of gravity of the battery unit 21 is located at the center in the vehicle width direction. This makes it easy to locate the center of gravity of the whole straddle vehicle 1, at the center of the straddle vehicle 1.

The fuel tank 14 is disposed outward of the vehicle body frame 30 in the vehicle width direction. The straddle vehicle 1 further includes a guard member 43 disposed outward of the fuel tank 14 in the vehicle width direction, to protect the fuel tank 14. Even in a case where the straddle vehicle 1 falls laterally, the guard member 43 can protect the fuel tank 14. In this way, it becomes possible to secure the space in which the fuel tank 14 is disposed and to protect the fuel tank 14.

Figure 4:
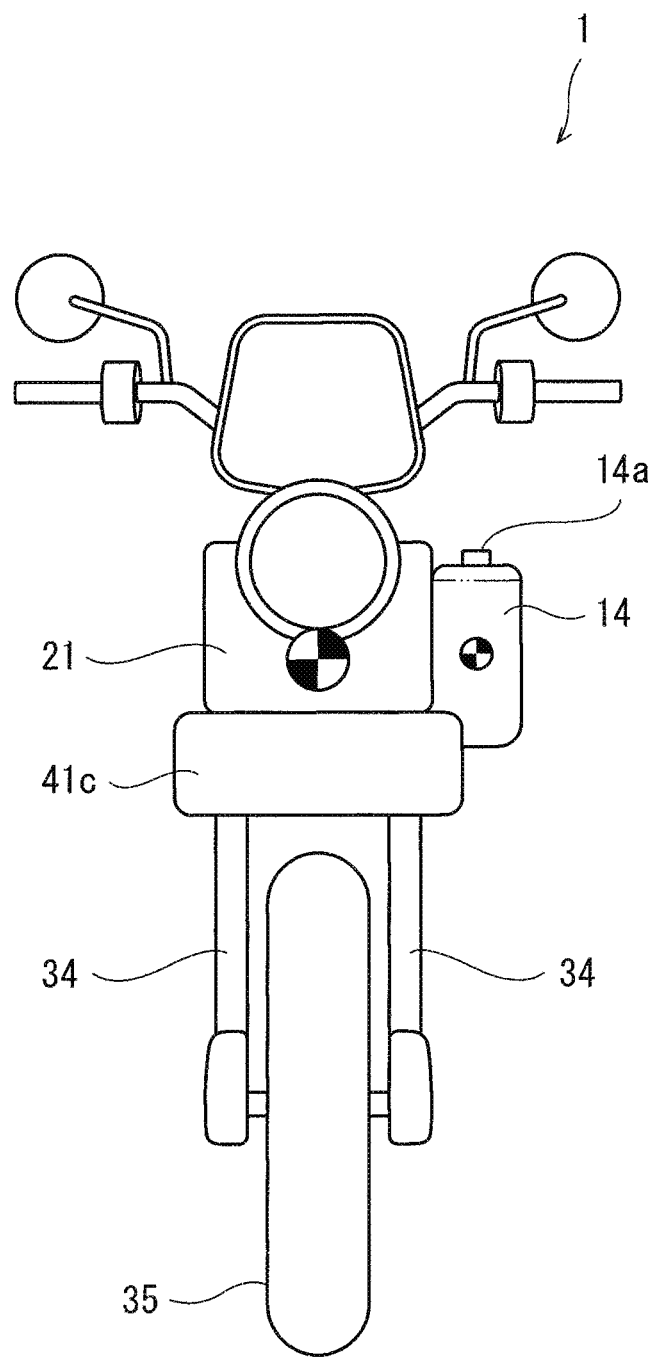
FIG. 4 is a front view showing the motorcycle which is an example of the straddle vehicle according to the embodiment.

As shown in FIG. 4, the fuel tank 14 is disposed on the left side of the straddle vehicle 1. The straddle vehicle 1 includes a side stand. By the side stand, the straddle vehicle 1 can stand for itself in a state in which the vehicle width center line is inclined to the left with respect to a vertical direction, when viewed from the front. Since the fuel tank 14 is disposed on the left side of the straddle vehicle 1, the fuel can be easily supplied to the fuel tank 14 in a state in which the straddle vehicle 1 stands by the side stand, which is an advantage.

In this case, the center of gravity of the whole straddle vehicle 1 is likely to be located on the left side. To cancel this, a coolant tank 44 may be disposed on the right side of the straddle vehicle 1. The coolant tank 44 serves to store therein a coolant used to cool the engine 3. This layout makes the external appearance of the straddle vehicle 1 laterally symmetric. In addition, the center of gravity of the straddle vehicle 1 can be easily located at the center of the straddle vehicle 1.

The embodiment of the present invention has been described. The above-described configuration can be suitably added, change and/or deleted. For example, as indicated by two-dot chain line of FIG. 3, a fuel tank 14A may be disposed at the front portion of the straddle vehicle 1. In this case, the fuel tank 14A is disposed between the axle of the front wheel 35 and the pivot 37 in the forward and rearward direction. The fuel tank 14A may be disposed on the left side of the straddle vehicle 1. Further, a fuel tank 14B may be disposed on the right side of the straddle vehicle 1.

What is claimed is:

1. A hybrid straddle vehicle comprising:
a vehicle body frame including a head pipe and a pair of right and left main frames extending rearward from the head pipe;
a hybrid traveling driving power unit including an engine and a traveling motor, the hybrid traveling driving power unit being configured to generate driving power for allowing the hybrid straddle vehicle to travel;
a fuel tank which stores therein fuel to be supplied to the engine; and
a battery unit which is disposed between the pair of right and left main frames and which stores therein electric power to be supplied to the traveling motor,
wherein an outer end of the fuel tank in a vehicle width direction is located outward of the battery unit in the vehicle width direction, and
wherein an upper end of the fuel tank is located below an upper end of the battery unit.

2. The hybrid straddle vehicle according to claim 1, further comprising a muffler,
wherein the fuel tank is located on a side opposite to the muffler with respect to a center line of the vehicle in the vehicle width direction.

3. The hybrid straddle vehicle according to claim 1, further comprising a swing arm supported by the pair of right and left main frames so that the swing arm is pivotable around a pivot extending in the vehicle width direction,
wherein the fuel tank is disposed between an axle of a rear wheel and the pivot in a forward and rearward direction.

4. The hybrid straddle vehicle according to claim 3,
wherein the fuel tank is disposed rearward of the engine, the traveling motor, and the battery unit.

5. The hybrid straddle vehicle according to claim 4,
wherein the vehicle body frame further includes a rear frame extending rearward from the pair of right and left main frames, and
wherein the fuel tank is disposed outward of the rear frame in the vehicle width direction.

6. The hybrid straddle vehicle according to claim 5,
wherein the fuel tank is supported by the rear frame.

7. The hybrid straddle vehicle according to claim 5, further comprising a seat disposed above the pair of right and left main frames or the rear frame,
wherein the fuel tank is disposed laterally of the seat.

8. The hybrid straddle vehicle according to claim 1,
wherein the fuel tank is disposed outward of one of the pair of right and left main frames in the vehicle width direction.

9. The hybrid straddle vehicle according to claim 1, further comprising:
a throttle body accommodating therein a throttle valve which adjusts an amount of intake-air to be supplied to the engine;
a fuel injector which is attached to the throttle body and injects fuel; and
a fuel chamber disposed between the fuel tank and the fuel injector,
wherein the fuel tank includes a fuel supply port, and
wherein the fuel chamber is disposed forward of the fuel tank, and rearward of the throttle body.

10. The hybrid straddle vehicle according to claim 9,
wherein the fuel chamber is disposed between a pair of right and left front forks.

11. The hybrid straddle vehicle according to claim 1, further comprising:
a guard member disposed outward of the fuel tank in the vehicle width direction.

12. A hybrid straddle vehicle comprising:
a hybrid traveling driving power unit including an engine and a traveling motor, the hybrid traveling driving power unit being configured to generate driving power for allowing the hybrid straddle vehicle to travel;
a fuel tank which stores therein fuel to be supplied to the engine; and
a battery unit which stores therein electric power to be supplied to the traveling motor,
wherein an outer end of the fuel tank in a vehicle width direction is located outward of the battery unit in the vehicle width direction,
wherein a center of gravity of the battery unit is located between a pair of right and left front forks, and
wherein in a state in which the fuel tank is fully filled with fuel, a center of gravity of the fuel tank is located outward of one of the pair of right and left front forks in the vehicle width direction.

13. A hybrid straddle vehicle comprising:
a vehicle body frame including a head pipe and a pair of right and left main frames extending rearward from the head pipe;
a hybrid traveling driving power unit including an engine and a traveling motor, the hybrid traveling driving power unit being configured to generate driving power for allowing the hybrid straddle vehicle to travel;
a fuel tank which stores therein fuel to be supplied to the engine;
a battery unit which is disposed between the pair of right and left main frames and which stores therein electric power to be supplied to the traveling motor; and
a side stand,
wherein the fuel tank includes a fuel supply port,
wherein the fuel supply port of the fuel tank is located on the same side as the side stand, and
wherein an outer end of the fuel tank in a vehicle width direction is located outward of the battery unit in the vehicle width direction.

14. A hybrid straddle vehicle comprising:
a vehicle body frame including a head pipe and a pair of right and left main frames extending rearward from the head pipe;
a hybrid traveling driving power unit including an engine and a traveling motor, the hybrid traveling driving power unit being configured to generate driving power for allowing the hybrid straddle vehicle to travel;
a fuel tank which stores therein fuel to be supplied to the engine;
a battery unit which is disposed between the pair of right and left main frames and which stores therein electric power to be supplied to the traveling motor; and
a muffler,
wherein the fuel tank includes a fuel supply port,
wherein the fuel supply port of the fuel tank is located on a side opposite to the muffler in a vehicle width direction, and
wherein an outer end of the fuel tank in the vehicle width direction is located outward of the battery unit in the vehicle width direction.

15. A hybrid straddle vehicle comprising:
a vehicle body frame including a head pipe and a pair of right and left main frames extending rearward from the head pipe;
a hybrid traveling driving power unit including an engine and a traveling motor, the hybrid traveling driving power unit being configured to generate driving power for allowing the hybrid straddle vehicle to travel;
a fuel tank which stores therein fuel to be supplied to the engine;
a battery unit which is disposed between the pair of right and left main frames and which stores therein electric power to be supplied to the traveling motor;
a transmission; and
a driving source casing accommodating the engine, the traveling motor, and the transmission,
wherein the engine, the traveling motor, and the transmission accommodated in the driving source casing are integrated into a unit,
wherein the battery unit is located above the driving source casing, and
wherein an outer end of the fuel tank in a vehicle width direction is located outward of the battery unit in the vehicle width direction.

16. A hybrid straddle vehicle comprising:
a vehicle body frame including a head pipe and a pair of right and left main frames extending rearward from the head pipe;
a hybrid traveling driving power unit including an engine and a traveling motor, the hybrid traveling driving power unit being configured to generate driving power for allowing the hybrid straddle vehicle to travel;
a fuel tank which stores therein fuel to be supplied to the engine;
a battery unit which is disposed between the pair of right and left main frames and which stores therein electric power to be supplied to the traveling motor;
a fuel pump; and
a coolant tank,
wherein an outer end of the fuel tank in a vehicle width direction is located outward of the battery unit in the vehicle width direction, and
wherein the coolant tank is located on a side opposite to the fuel pump in the vehicle width direction.

17. A hybrid straddle vehicle comprising:
a vehicle body frame including a head pipe and a pair of right and left main frames extending rearward from the head pipe;
a hybrid traveling driving power unit including an engine and a traveling motor, the hybrid traveling driving power unit being configured to generate driving power for allowing the hybrid straddle vehicle to travel;
a fuel tank which stores therein fuel to be supplied to the engine;
a battery unit which is disposed between the pair of right and left main frames and which stores therein electric power to be supplied to the traveling motor; and
a driving power transmission unit to which the driving power generated by the traveling driving power unit is transmitted,
wherein the fuel tank is located on the same side as the driving power transmission unit with respect to a center line of the vehicle in a vehicle width direction, and is located above the driving power transmission unit, and
wherein an outer end of the fuel tank in the vehicle width direction is located outward of the battery unit in the vehicle width direction.

18. A hybrid straddle vehicle comprising:
a vehicle body frame including a head pipe and a pair of right and left main frames extending rearward from the head pipe;
a hybrid traveling driving power unit including an engine and a traveling motor, the hybrid traveling driving power unit being configured to generate driving power for allowing the hybrid straddle vehicle to travel;
a fuel tank which stores therein fuel to be supplied to the engine; and
a battery unit which is disposed between the pair of right and left main frames and which stores therein electric power to be supplied to the traveling motor,
wherein the fuel tank is mounted on a left side of a front portion of the vehicle and located outward of the left main frame in a vehicle width direction, and
wherein an outer end of the fuel tank in the vehicle width direction is located outward of the battery unit in the vehicle width direction.

19. A hybrid straddle vehicle comprising:
a vehicle body frame including a head pipe and a pair of right and left main frames extending rearward from the head pipe;
a hybrid traveling driving power unit including an engine and a traveling motor, the hybrid traveling driving power unit being configured to generate driving power for allowing the hybrid straddle vehicle to travel;
a fuel tank which stores therein fuel to be supplied to the engine; and
a battery unit which is disposed between the pair of right and left main frames and which stores therein electric power to be supplied to the traveling motor,
wherein the fuel tank is mounted on a right side of a front portion of the vehicle and located outward of the right main frame in a vehicle width direction, and
wherein an outer end of the fuel tank in the vehicle width direction is located outward of the battery unit in the vehicle width direction.

* * * * *